US010060392B2

(12) United States Patent
Yamazaki et al.

(10) Patent No.: US 10,060,392 B2
(45) Date of Patent: Aug. 28, 2018

(54) STRATIFIED SCAVENGING TWO-STROKE INTERNAL COMBUSTION ENGINE AND CARBURETOR THEREOF

(71) Applicant: Yamabiko Corporation, Tokyo (JP)

(72) Inventors: Takahiro Yamazaki, Tokyo (JP); Shirou Yamaguchi, Tokyo (JP); Takamasa Otsuji, Tokyo (JP)

(73) Assignee: Yamabiko Corporation, Tokyo (JP)

( * ) Notice: Subject to any disclaimer, the term of this patent is extended or adjusted under 35 U.S.C. 154(b) by 190 days.

(21) Appl. No.: 14/715,625

(22) Filed: May 19, 2015

(65) Prior Publication Data

US 2015/0337765 A1 Nov. 26, 2015

(30) Foreign Application Priority Data

May 21, 2014 (JP) ................................ 2014-105688

(51) Int. Cl.
*F02B 25/00* (2006.01)
*F02M 17/12* (2006.01)
(Continued)

(52) U.S. Cl.
CPC ............. *F02M 17/12* (2013.01); *F02B 25/22* (2013.01); *F02B 33/04* (2013.01); *F02B 63/02* (2013.01); *F02M 9/08* (2013.01); *F02M 17/34* (2013.01); *F02M 19/08* (2013.01); *F02M 35/108* (2013.01); *F02M 35/1017* (2013.01);
(Continued)

(58) Field of Classification Search
CPC .... F02B 2075/025; F02B 25/22; F02B 33/04; F02B 63/02; F02M 17/12; F02M 17/34; F02M 19/08; F02M 35/1017; F02M 35/1019; F02M 35/10196;
(Continued)

(56) References Cited

U.S. PATENT DOCUMENTS 2,636,488 A * 4/1953 Cedarholm ............ F02M 25/00
123/25 A
2,896,599 A * 7/1959 Ensign .................. F02M 21/00
123/179.16
(Continued)

FOREIGN PATENT DOCUMENTS

JP H01-300045 12/1989

OTHER PUBLICATIONS

Extended European Search Report issued in corresponding European Patent Application No. 15168726.6 dated Sep. 23, 2015 (7 pages).
(Continued)

*Primary Examiner* — Marguerite McMahon
*Assistant Examiner* — Tea Holbrook
(74) *Attorney, Agent, or Firm* — Kilyk & Bowersox, P.L.L.C.

(57) ABSTRACT

A carburetor achieves better emission characteristics while improving a combustion state by increasing a delivery ratio of a stratified scavenging engine and reducing intake resistance. No dividing wall is provided between a throttle valve 204 and a choke valve 242, and a gap 244 between the valves 204 and 242 is opened. Intake air in both of an upper region and a lower region of the choke valve 242 flows into an air-fuel mixture passage 246 in a lower region of the fully-open throttle valve 204. A main nozzle 202 is arranged so as to be inclined toward the throttle valve 204.

9 Claims, 13 Drawing Sheets

(51) Int. Cl.

| | |
|---|---|
| ***F02M 17/34*** | (2006.01) |
| ***F02M 35/10*** | (2006.01) |
| ***F02M 35/108*** | (2006.01) |
| ***F02B 25/22*** | (2006.01) |
| ***F02B 33/04*** | (2006.01) |
| ***F02B 63/02*** | (2006.01) |
| ***F02M 9/08*** | (2006.01) |
| ***F02M 19/08*** | (2006.01) |
| *F02B 75/02* | (2006.01) |

(52) U.S. Cl.
CPC .. *F02M 35/1019* (2013.01); *F02M 35/10196* (2013.01); *F02M 35/10255* (2013.01); *F02M 35/10262* (2013.01); *F02B 2075/025* (2013.01); *Y02T 10/14* (2013.01); *Y02T 10/146* (2013.01)

(58) Field of Classification Search
CPC ....... F02M 35/10255; F02M 35/10262; F02M 35/108; F02M 9/08
USPC ....... 123/65 R, 73 A, 73 AA, 442, 437, 701, 123/702, 184.39, 184.46
See application file for complete search history.

(56) References Cited

U.S. PATENT DOCUMENTS

| | | | | | |
|---|---|---|---|---|---|
| 3,078,079 | A * | 2/1963 | Mick | F02M 1/00 | 261/44.6 |
| 3,738,608 | A * | 6/1973 | Nutten | F02M 7/133 | 123/198 DB |
| 3,948,231 | A * | 4/1976 | Smith | F02D 9/02 | 123/332 |
| 3,963,809 | A * | 6/1976 | Steiner | F02M 7/20 | 137/512.2 |
| 6,000,369 | A * | 12/1999 | Koizumi | F02M 17/04 | 123/179.16 |
| 6,289,856 | B1 | 9/2001 | Noguchi | | |
| 7,100,551 | B2 | 9/2006 | Rosskamp | | |
| 7,201,120 | B2 | 4/2007 | Geyer et al. | | |
| 7,513,225 | B2 | 4/2009 | Geyer et al. | | |
| 2001/0007251 | A1* | 7/2001 | Hehnke | F02M 1/02 | 123/588 |
| 2001/0020454 | A1 | 9/2001 | Kobayashi | | |
| 2002/0139326 | A1 | 10/2002 | Araki | | |
| 2003/0106508 | A1* | 6/2003 | Rosskamp | F02B 25/22 | 123/73 PP |
| 2003/0140874 | A1 | 7/2003 | Zama et al. | | |
| 2004/0036184 | A1* | 2/2004 | Nonaka | F02M 1/04 | 261/42 |
| 2005/0034689 | A1* | 2/2005 | Toda | F02B 25/02 | 123/65 R |
| 2005/0120985 | A1* | 6/2005 | Rosskamp | F02B 25/22 | 123/73 PP |
| 2005/0188952 | A1 | 9/2005 | Prager | | |
| 2006/0219194 | A1 | 10/2006 | Geyer et al. | | |
| 2008/0035091 | A1* | 2/2008 | Geyer | F02B 25/22 | 123/184.52 |
| 2009/0194726 | A1 | 8/2009 | Aihara et al. | | |
| 2011/0095215 | A1* | 4/2011 | Larsson | F02D 9/1055 | 251/129.01 |
| 2012/0060381 | A1* | 3/2012 | Kunert | F02B 25/14 | 30/381 |
| 2012/0146249 | A1 | 6/2012 | Sugishita et al. | | |
| 2013/0228152 | A1 | 9/2013 | Ono et al. | | |

OTHER PUBLICATIONS

Notice of the Submission of publications or the like received in corresponding Japanese Patent Application No. 2014-105688 dated Mar. 15, 2016 with English translation (32 pages).

* cited by examiner

STRATIFIED SCAVENGING TWO-STROKE INTERNAL COMBUSTION ENGINE AND CARBURETOR THEREOF

CROSS-REFERENCE TO RELATED APPLICATIONS

The present application claims priority from Japanese Patent Application No. 2014-105688, filed May 21, 2014, which is incorporated herein by reference.

FIELD OF THE INVENTION

The present invention relates to a stratified scavenging two-stroke internal combustion engine and a carburetor incorporated therein. The present invention typically relates to a single-cylinder engine mounted on a portable working machine such as a brush cutter, a chain saw, and a power blower, and a carburetor incorporated in the single-cylinder engine.

BACKGROUND OF THE INVENTION

U.S. Pat. No. 7,201,120 B2 discloses a single-cylinder two-stroke internal combustion engine mounted on a portable working machine. A carburetor is incorporated in this type of two-stroke engine.

A basic structure and an operation of a general carburetor will be described with reference to FIGS. 18 to 20. The carburetor is defined as follows: "liquid fuel is sprayed in a mist into an intake air passage within the carburetor by using Bernoulli's principle, thereby generating an air-fuel mixture in which the mist fuel and intake air are mixed". The carburetor includes a venturi portion in order to utilize the Bernoulli's principle.

As is well known, the venturi portion means a structure in which the intake air passage within the carburetor is constricted in an intermediate region of the intake air passage. When the intake air passes through the venturi portion, a flow velocity of the intake air increases. When the flow velocity increases, a static pressure of the intake air decreases, so that the liquid fuel is drawn out into the intake air passage. According to the theory, in the conventional carburetor, a port or a nozzle that feeds the fuel to the intake air passage is positioned in the vicinity of a top portion of the venturi portion.

Referring to FIGS. 18 to 20, an arrow in the drawings indicates a flow of intake air of an engine. A carburetor 100 includes an intake air passage 102, and air filtered by an air cleaner (not shown) passes through the intake air passage 102. The intake air passage 102 includes a venturi portion 104. A throttle valve 106 is arranged downstream of the venturi portion 104, and a choke valve 108 is arranged upstream of the venturi portion 104 in the intake air passage 102. Each of the throttle valve 106 and the choke valve 108 is composed of a butterfly valve. The butterfly valve has a disk shape.

The carburetor 100 has a main system that feeds fuel to the intake air passage 102 in a partial operation (a partial load range) and a high-speed operation (a high load range), and an idle system that feeds fuel to the intake air passage 102 in a low-speed operation such as an idle operation. The main system is also called a throttle system. The idle system is also called a slow system.

The carburetor 100 in the drawings includes a main port 110 of the main system, and a slow port 112 of the slow system. The main port 110 is positioned at a top portion of the venturi portion 104. The slow port 112 is positioned in the vicinity of a peripheral edge of the throttle valve 106 at a fully-closed position of the throttle valve 106. The slow port 112 is composed of first to third idle ports 112(1) to 112(3).

The first idle port 112(1) is called a "primary idle port". The first idle port 112(1) is located on a downstream side of an air flow direction. The third idle port 112(3) is located on an upstream side of the air flow direction. The second idle port 112(2) is positioned between the first idle port 112(1) and the third idle port 112(3).

FIG. 18 shows a state of the carburetor in the idle operation. In the idle operation, the throttle valve 106 is at a fully-closed position. In this state, the fuel is fed from the first idle port 112(1).

FIG. 19 shows a state of the carburetor in the partial operation. In the partial operation, the throttle valve 106 is in a partially-open state. In this state, the fuel is fed from the main port 110 as well as from the first to third idle ports 112(1) to 112(3).

FIG. 20 shows a state of the carburetor in the high-speed operation. In the high-speed operation, the throttle valve 106 is in a fully-open state. The high-speed operation is called a "full throttle" operation. In the high-speed operation, the fuel is fed from the first to third idle ports 112(1) to 112(3) and the main port 110 similarly to the above partial operation. In the high-speed operation, a large amount of fuel is fed to the intake air passage 102. Therefore, in the high-speed operation, the fuel fed to the intake air passage 102 is mainly fed from the main port 110 located at the top portion of the venturi portion 104.

U.S. Pat. No. 7,100,551 B2 discloses a carburetor incorporated in a stratified scavenging two-stroke engine. The stratified scavenging two-stroke internal combustion engine is described in detail in Japanese Patent Laid-Open No. 2002-227653 and International Publication No. WO 98/57053.

In the stratified scavenging two-stroke engine, scavenging is performed by introducing leading air into a combustion chamber at an initial stage of a scavenging stroke and subsequently introducing an air-fuel mixture into the combustion chamber in order to reduce a blow-by phenomenon of an unburnt gas occurring at the initial stage of the scavenging stroke. In the carburetor incorporated in the stratified scavenging engine, a fresh air passage that feeds air filtered by an air cleaner to an engine body, and an air-fuel mixture passage that generates an air-fuel mixture and feeds the air-fuel mixture to the engine body (a crankcase) are formed when a throttle valve is in a fully-open state. The fresh air passage is connected to a scavenging passage that communicates with the crankcase and the combustion chamber.

In the stratified scavenging engine, it is desirable to fill an upper portion of the scavenging passage with the fresh air in an amount equivalent to the blow-by of the unburnt gas, and also to fill the crankcase of the engine body with the whole air-fuel mixture generated in the carburetor in a state of a full throttle (a high-speed operation).

The carburetor disclosed in U.S. Pat. No. 7,100,551 B2 includes a dividing wall within the carburetor arranged on an upstream side of the throttle valve. The dividing wall within the carburetor divides an intake air passage on the upstream side of the throttle valve into a first passage and a second passage. That is, each of the first and second passages divided by the dividing wall independently extends to the vicinity of the throttle valve from an upstream end of the carburetor.

When the throttle valve is in a fully-open state, the throttle valve becomes adjacent to the dividing wall within the carburetor, and the first passage and the second passage are thereby extended to a downstream end of the carburetor by the throttle valve in the high-speed operation (the full throttle).

In the full throttle, i.e., the high-speed operation, the fresh air filtered by the air cleaner is fed to the engine body through the first passage.

In the carburetor disclosed in U.S. Pat. No. 7,100,551 B2, a main port located at a top portion of a venturi portion is located facing the dividing wall within the carburetor. The second passage constitutes the air-fuel mixture passage, and the air-fuel mixture is fed to the engine body (the crankcase).

FIG. 21 shows a schematic diagram of the carburetor disclosed in U.S. Pat. No. 7,201,120 B2. Referring to FIG. 21, a carburetor 200 of U.S. Pat. No. 7,201,120 B2 includes a main nozzle 202. Reference numeral 204 denotes a throttle valve, and reference numeral 206 denotes a venturi portion. Note that reference numeral 208 denotes an air cleaner.

The main nozzle 202 is arranged in the vicinity of a top portion of the venturi portion 206, and is positioned in a state inclined toward a plate surface of the throttle valve 204 in a fully-open state. That is, the main nozzle 202 is arranged so as to be inclined toward a downstream side. On the other hand, a protrusion portion 212 is formed at an upstream end portion of the throttle valve 204, and protrudes into an air-fuel mixture passage so as to approach the main nozzle. The protrusion portion 212 is provided for the purpose of increasing a flow velocity of intake air indicated by an arrow by constricting the air-fuel mixture passage.

Reference numeral 220 shown in FIG. 21 denotes an intake member. The carburetor 200 is connected to an engine body 214 by the intake member 220. The intake member 220 includes a fresh air passage 224 and an air-fuel mixture passage 226 formed by a dividing wall 222. The air-fuel mixture passage 226 communicates with a crankcase 216 of the engine body 214.

In a full throttle, i.e., a high-speed operation, fuel discharged from the main nozzle 202 is received by the throttle valve 204, and is entirely fed to the crankcase 216 of the engine body 214. In FIG. 21, reference numeral 218 denotes a piston, and reference numeral 228 denotes a combustion chamber.

SUMMARY OF THE INVENTION

Problems to be Solved by the Invention

The carburetors disclosed in U.S. Pat. Nos. 7,201,120 B2 and 7,100,551 B2 can prevent the air-fuel mixture from entering the fresh air passage by the throttle valve when the throttle valve is in a fully-open state.

In the carburetor 200 (FIG. 21) disclosed in U.S. Pat. No. 7,201,120 B2, the air-fuel mixture is generated by the intake air flowing into a gap formed between the protrusion portion 212 on a lower surface of the throttle valve 204 and the venturi portion 206.

In the carburetor disclosed in U.S. Pat. No. 7,100,551 B2, the air-fuel mixture is generated by the intake air passing through the second passage that is divided by the dividing wall within the carburetor.

As described above, the main nozzle or the main port is positioned at the top portion of the venturi portion or in the vicinity of the top portion in the conventional carburetor.

Referring to FIG. 21, the carburetor in U.S. Pat. No. 7,201,120 B2 proposes to substantially narrow an interval between the throttle valve 204 and the venturi portion 206 by the protrusion portion 212 of the throttle valve 204 in order to increase the flow velocity and increase a degree of separation between the air-fuel mixture and the fresh air. However, this is equivalent to reducing an amount of the intake air available for generating the air-fuel mixture. That is, it is difficult to increase a delivery ratio due to a structure in which an amount of the air-fuel mixture introduced into the crankcase is limited. The protrusion portion 212 also works as an element that increases intake resistance.

In accordance with the carburetor in U.S. Pat. No. 7,100,551 B2, the inside of the carburetor is fully divided into the air-fuel mixture passage and the fresh air passage from the upstream end to the downstream end. Thus, an amount of air available for generating the air-fuel mixture is always defined by an effective sectional area of each passage, and thus, is about half of an amount of the intake air introduced from the air cleaner by the carburetor.

An object of the present invention is to provide a carburetor capable of achieving better emission characteristics while improving a combustion state by increasing a delivery ratio of a stratified scavenging engine and reducing intake resistance, and a stratified scavenging engine including the carburetor.

Another object of the present invention is to provide a carburetor in which it is easy to maintain a high degree of separation between an air-fuel mixture generated in the carburetor and fresh air fed to an upper portion of a scavenging passage, and a stratified scavenging engine including the carburetor.

Yet another object of the present invention is to provide a carburetor capable of miniaturization, and a stratified scavenging engine including the carburetor.

Means for Solution of the Problems

According to one aspect of the present invention, the above technical objects are achieved by providing a carburetor for a stratified scavenging type engine, the carburetor being interposed between an engine body of the stratified scavenging two-stroke engine and an air cleaner, the carburetor including:

an intake air passage that receives air filtered by the air cleaner;

a throttle valve that is arranged in the intake air passage and is composed of a plate butterfly valve; and a main nozzle or a main port that discharges fuel toward a plate surface of the throttle valve in a fully-open state, wherein an upstream side of the throttle valve is composed of an open space with no dividing wall.

The carburetor according to the present invention may include a choke valve, or may temporarily feed thick fuel to the intake air passage electrically instead of the choke valve. A shutter that reduces an amount of air flowing into the carburetor may be provided on an upstream-side end surface of the carburetor, and a function of the choke valve may be exerted by the shutter.

In a carburetor in which a choke valve composed of a butterfly valve is arranged upstream of a throttle valve, an interval between the throttle valve and the choke valve both in a fully-open state may be composed of an open space.

According to another aspect of the present invention, the above technical objects are achieved by providing a stratified scavenging two-stroke internal combustion engine, including a carburetor for the stratified scavenging two-stroke engine, the carburetor being interposed between a piston valve-type engine body of the stratified scavenging two-stroke engine and an air cleaner, the carburetor including:

an intake air passage that receives air filtered by the air cleaner;

a throttle valve that is arranged in the intake air passage and is composed of a plate butterfly valve; and a main nozzle or a main port that discharges fuel toward a plate surface of the throttle valve in a fully-open state, an upstream side of the throttle valve being composed of an open space with no dividing wall, wherein the carburetor and the engine body are connected via an intake passage, the intake passage is divided into a fresh air passage and an air-fuel mixture passage by a dividing wall, and the air-fuel mixture passage is capable of communicating with a crankcase of the engine body.

FIG. 1 shows a diagram for explaining a principle of the present invention. An example shown in FIG. 1 is one typical example of the carburetor according to the present invention. A carburetor shown in FIG. 1 includes a choke valve. Among elements shown in FIG. 1, the same elements as those in FIG. 21 (the schematic diagram of the carburetor disclosed in U.S. Pat. No. 7,201,120 B2) are assigned the same reference numerals as those in FIG. 21.

Reference numeral 240 shown in FIG. 1 denotes a typical example of the carburetor according to the present invention, and reference numeral 242 denotes the choke valve. FIG. 1 shows the throttle valve 204 and the choke valve 242 both in a fully-open state. The crankcase 216 is filled with an air-fuel mixture generated in the carburetor through the air-fuel mixture passage 226 of the intake member 220 during an upstroke of the piston 218. When a scavenging stroke is started after combustion, fresh air in an upper portion of a scavenging passage 227 is first introduced into the combustion chamber 228, and the air-fuel mixture in the crankcase 216 is subsequently introduced into the combustion chamber 228.

The intake member 220 is a member that constitutes an intake passage for feeding the fresh air and the air-fuel mixture from the carburetor 240 to the engine body 214. The intake member 220 may be composed of a single member or a plurality of members in a longitudinal direction.

An air-fuel mixture port 226*a* provided in a cylinder peripheral surface opens toward the crankcase 216, and an air port located above the air-fuel mixture port 226*a* communicates with a piston groove 219 provided in a piston peripheral surface during an upstroke of the piston 218 from the bottom dead center to the top dead center. Here, the piston groove means a conventionally-known groove provided in the piston peripheral surface for bringing the air port and the upper portion of the scavenging passage into communication. Subsequently, when the piston groove and the scavenging passage communicate with each other, the upper portion of the scavenging passage starts to be filled with the fresh air.

While the above stratified scavenging engine is the engine including the piston groove, the present invention can be also suitably applied to a reed valve-type stratified scavenging engine described in Japanese Patent Laid-Open No. 2002-227653. In the reed valve-type stratified scavenging engine, filling of a scavenging passage with fresh air is controlled by a reed valve.

An engine in which the carburetor of the present invention is most effectively used is an engine in which an opening timing of the air-fuel mixture port is set to be earlier than a timing at which the air port and the scavenging passage communicate with each other via the piston groove. In the engine, a flow in the carburetor is generated from a lower side of the throttle valve (the air-fuel mixture passage side).

The carburetor 240 according to the present invention does not include a dividing wall between the throttle valve 204 and the choke valve 242. That is, a gap 244 between the throttle valve 204 and the choke valve 242 is opened.

Intake air in both of an upper region and a lower region of the choke valve 242 flows into an air-fuel mixture passage 246 within the carburetor 240 formed by the fully-open throttle valve. That is, a whole amount of air flowing into the carburetor 240 from the air cleaner 208 flows into the air-fuel mixture passage 246 at some timing.

Fuel discharged from the main nozzle 202 is fed to the air-fuel mixture passage 246 within the carburetor formed by the fully-open throttle valve 204. A main port may be employed instead of the main nozzle 202.

The above carburetor 200 shown in FIG. 21 includes the protrusion portion 212 at the upstream end portion of the throttle valve 204, and the venturi portion 206 immediately upstream of the throttle valve 204. Thus, a gap 250 between the throttle valve 204 (the protrusion portion 212) and the venturi portion 206 is set to be relatively small for the purpose of increasing the flow velocity. However, since the interval between the protrusion portion 212 and the venturi portion 206 is narrowed, intake resistance increases, and turbulence in the flow occurs around the protrusion portion 212. An amount of intake air for generating the air-fuel mixture is thereby limited. On the other hand, a relatively large amount of fresh air is introduced into the engine body 214 since no resistance element exists in a fresh air passage above the fully-open throttle valve 204.

To improve a "blow-by" phenomenon of an unburnt gas, it is essential to introduce the fresh air for stratified scavenging. However, blow-by of the two-stroke engine is 20% to 25%. It is necessary to fill the combustion chamber 228 with a sufficient amount of air-fuel mixture having an appropriate concentration for maintaining a normal combustion state after an exhaust port is closed. Introducing the fresh air in an amount too large to maintain the combustion in the engine causes a decrease in power and a deterioration in acceleration while achieving a reduction in exhaust gas.

The carburetor 200 shown in FIG. 21 achieves separation between the fresh air and the air-fuel mixture, and successfully introduces the fresh air and the air-fuel mixture in a separated state into the stratified scavenging engine body 214. However, a feed balance between the air-fuel mixture and the fresh air, a feed timing into the engine, and an appropriate combustion state in the engine body 214 are not considered.

In the carburetor 240 according to the present invention shown in FIG. 1, reference numeral 252 denotes an inlet of the air-fuel mixture passage 246 within the carburetor. The inlet 252 of the air-fuel mixture passage 246 within the carburetor is relatively larger than the gap 250 shown in FIG. 21. That is, in accordance with the carburetor 240 according to the present invention, the intake air passing through an upper side and a lower side of the choke valve 242, i.e., the whole intake air entering the carburetor 240 from the air cleaner is in a state in which the intake air can flow into the inlet 252 of the air-fuel mixture passage 246 within the carburetor.

Therefore, by employing the carburetor of the present invention, it is possible to improve a delivery ratio of the stratified scavenging engine since a relatively large amount of air-fuel mixture can be drawn in the crankcase 216. Accordingly, the power of the stratified scavenging engine can be increased.

In FIG. 1 illustrating the carburetor 240 according to the present invention, the venturi portion 206 shown in FIG. 21 is not illustrated. The inventors of this patent application have verified that the venturi portion is not essential in the carburetor applied to the stratified scavenging engine. Therefore, the venturi portion 206 may be omitted from the carburetor 240 of the present invention. Accordingly, the intake resistance is further reduced, the turbulence in the flow within the air-fuel mixture passage becomes difficult to occur, and the air-fuel mixture is more smoothly introduced.

Of course, the carburetor 240 according to the present invention may include the venturi portion 206 similarly to the conventional case. The carburetor 200 shown in FIG. 21 includes the protrusion portion 212 at the upstream end portion of the throttle valve 204. In contrast, the carburetor 240 according to the present invention does not include the protrusion portion 212. Therefore, the wider inlet 252 of the air-fuel mixture passage 246 within the carburetor than that of the conventional case can be ensured.

In the carburetor 240 according to the present invention, the main nozzle 202 or the main port may be arranged at the top portion of the venturi portion 206 or in the vicinity of the top portion as shown in FIG. 2. The main nozzle 202 or the main port may be also arranged apart from the top portion of the venturi portion 206 or the vicinity of the top portion as shown in FIG. 3. The venturi portion 206 is preferably formed lower than that of the conventional carburetor. The main nozzle 202 is preferably arranged in an inclined state.

A discharge port of the main nozzle 202 is preferably located at a position not interfering with an outer end edge of the rotating throttle valve 204, and adjacent to the moving locus of the outer end edge.

Other objects and advantages of the present invention will be apparent from the following detailed description of a plurality of specific examples of the present invention.

DETAILED DESCRIPTION OF THE PRESENT INVENTION

In the following, a carburetor according to the present invention will be described based on the accompanying drawings.

Figure 4:
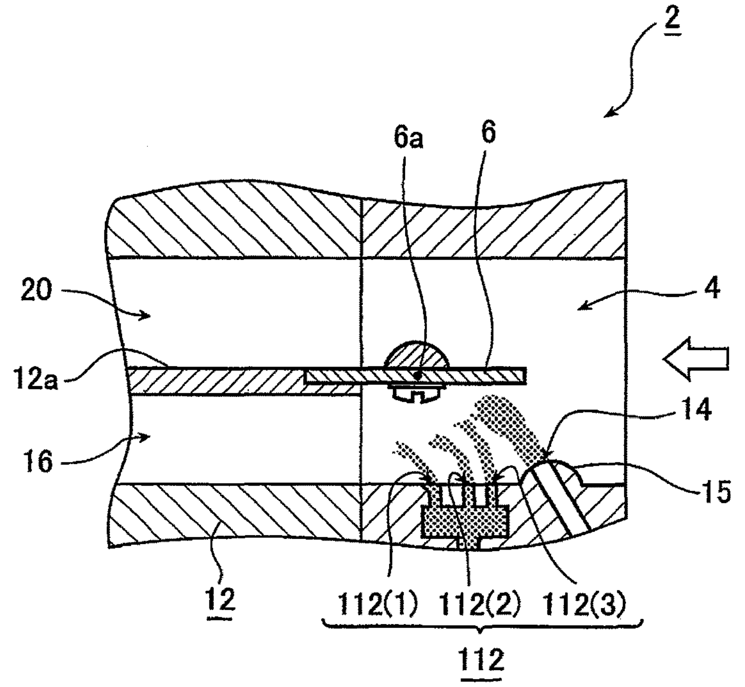
FIG. 4 shows a diagram for explaining the principle of the present invention by employing a carburetor including a main port as an example, in which a throttle valve is in a fully-open state.
Figure 5:
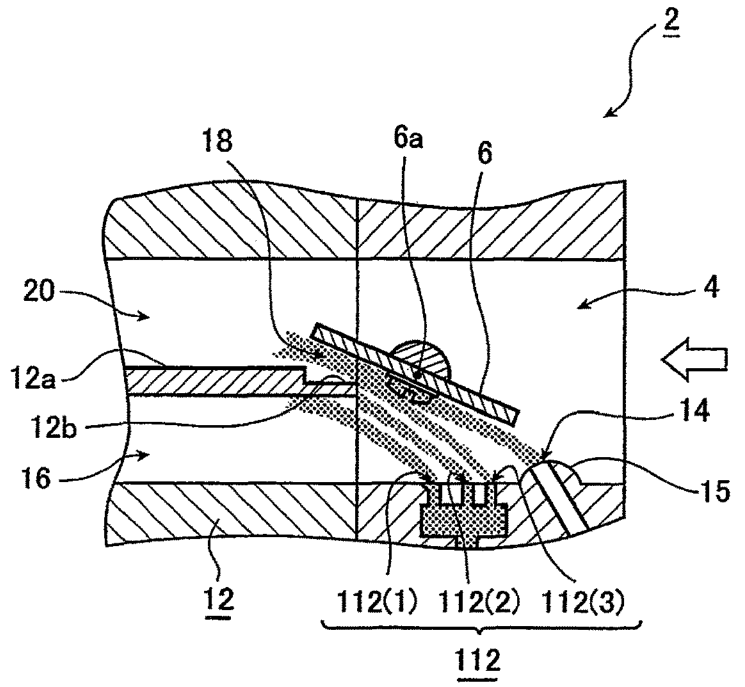
FIG. 5 shows a diagram for explaining the principle of the present invention by employing the carburetor including the main port as an example, in which the throttle valve is in a partially-open state.

FIGS. 4 and 5 show diagrams for explaining one specific example of the carburetor according to the present invention. Reference numeral 2 shown in FIGS. 4 and 5 denotes a throttle valve-type carburetor. The carburetor 2 is incorporated in a conventionally-known stratified scavenging two-stroke internal combustion engine. The stratified scavenging two-stroke engine has various configurations. Since a mechanism and an action of the stratified scavenging engine are described in detail in Japanese Patent Laid-Open No. 2002-227653 and International Publication No. WO 98/57053, Japanese Patent Laid-Open No. 2002-227653 and International Publication No. WO 98/57053 are incorporated herein.

An outline of the stratified scavenging two-stroke engine is as follows. The stratified scavenging two-stroke engine includes a scavenging passage that communicates with a crankcase and a combustion chamber similarly to a general two-stroke engine. The crankcase is filled with an air-fuel mixture. The air-fuel mixture in the crankcase is introduced into the combustion chamber through the scavenging passage. The stratified scavenging two-stroke engine is characterized in that leading air containing no fuel component is introduced into the combustion chamber immediately before the air-fuel mixture in the crankcase is introduced into the combustion chamber in a scavenging stroke, that is, at an initial stage of the scavenging stroke.

Referring to FIGS. 4 and 5, the carburetor 2 includes an intake air passage 4. A throttle valve 6 is arranged in the intake air passage 4. The throttle valve 6 can swing about a shaft 6*a*. An amount of intake air changes depending on an opening degree of the throttle valve 6, so that engine power is controlled. In the drawings, an arrow indicates a flow direction of the intake air. Air filtered by an air cleaner is fed to the carburetor 2. A downstream end of the carburetor 2 is connected to an engine body via an intake member 12.

The intake member 12 is a member that connects the carburetor 2 and the engine body, and that constitutes an intake passage. The intake member 12 may be composed of a single member that is continuous in a longitudinal direction, or may be composed of a plurality of members.

The intake air passage 4 may include a venturi portion similarly to the conventional carburetor, or may not include the venturi portion as in an embodiment described later. In a case in which the intake air passage 4 includes a venturi portion having a conventional height, it is preferable to suppress an entire projecting height by inclining a main nozzle toward a downstream side of the flow direction.

A main port 14 is arranged immediately upstream of the throttle valve 6 so as to face the intake air passage 4. The main port 14 preferably opens obliquely toward the downward side of the flow direction of the intake air. It is also preferable to form a small bulge 15 on a wall surface of the intake air passage 4, and locate the opening of the main port 14 in the vicinity of a top portion of the local small bulge 15 as shown in the drawings.

FIG. 4 shows a state of the carburetor 2 in a high-speed operation. In the high-speed operation, that is, when the throttle valve 6 is in a fully-open state, an air-fuel mixture passage 16 is formed by the throttle vale 6 and a dividing wall 12*a* of the intake member 12 located downstream of the throttle vale 6 similarly to the conventional carburetor. Fuel discharged from the main port 14 is guided by the throttle valve 6 to pass through the air-fuel mixture passage 16 to fill the crankcase of the engine body.

FIG. 5 shows a state of the carburetor 2 in a partial operation. In the partial operation, the throttle valve 6 is in a partially-open state. The fuel discharged from the main port 14 partially flows into a fresh air passage 20 similarly to the conventional carburetor through a gap 18 between a downstream end of the partially-open throttle valve 6 and the dividing wall 12*a* of the intake member 12. A large portion of the fuel discharged from the main port 14 is fed to the engine body through the air-fuel mixture passage 16.

Figure 6:
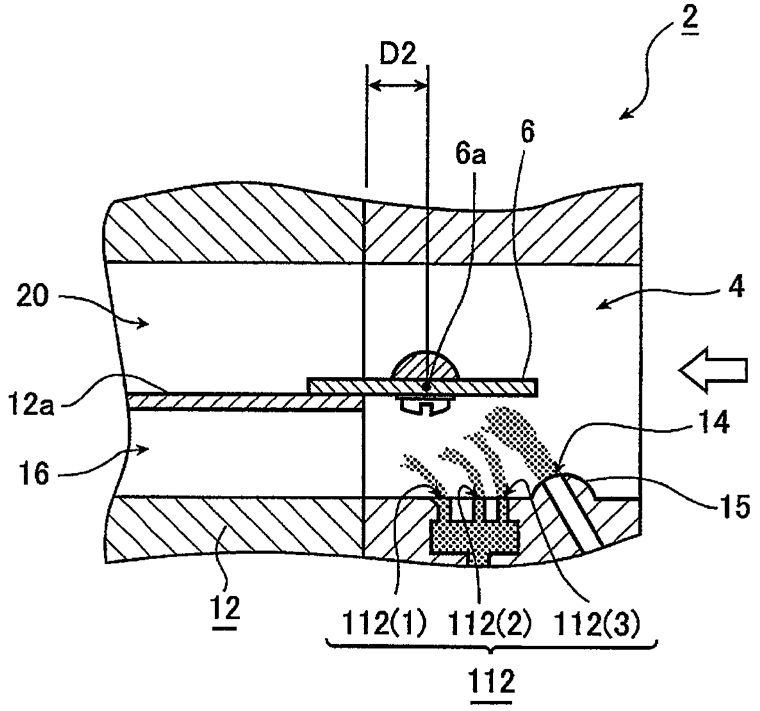
FIG. 6 shows a diagram for explaining a modification of a dividing wall of an intake member connected to the carburetor including the main port, in which the throttle valve is in a fully-open state.
Figure 7:
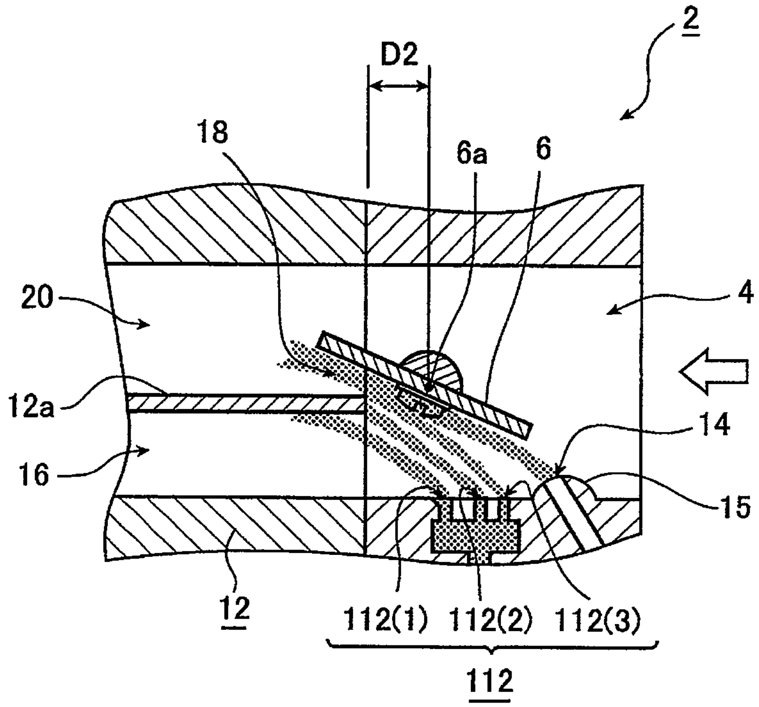
FIG. 7 shows a diagram for explaining the modification of the dividing wall of the intake member connected to the carburetor including the main port, in which the throttle valve is in a partially-open state.

Reference character D2 in FIGS. 6 and 7 denotes a distance between the shaft 6*a* of the throttle valve 6 and a downstream end of the intake air passage 4. It should be understood that the distance D2 is smaller than that in the conventional carburetor. That is, the throttle valve shaft 6*a* is positioned adjacent to the downstream end of the intake air passage. The distance D2 is about 2.5 to 6.0 mm, preferably about 2.6 to 5.0 mm, and most preferably about 2.8 to 4.0 mm when the throttle valve shaft 6*a* has a diameter of 5.0 mm.

The gap 18 between the partially-open throttle valve 6 and the dividing wall 12*a* of the intake member 12 can be decreased by the arrangement of the throttle valve shaft 6*a*. In other words, a degree of separation between the air-fuel mixture and fresh air in the partial operation can be controlled by a size of the relatively small gap 18. The distance D2 between the throttle valve shaft 6*a* and the downstream end of the intake air passage 4 may be determined so as to set the degree of separation in the partial operation to a desired value.

It goes without saying that the technical concept of setting the distance D2 to a small value is not limited to the embodiment of the present invention, and can be also widely and generally applied to the stratified scavenging two-stroke internal combustion engine.

Of course, an arrangement position of the main port 14 may be set to a position at which the main port 14 can work similarly to the conventional carburetor in an idle range, a partial range, and a high-speed range. To be more specific, the arrangement position of the main port 14 is set to a position satisfying the following conditions. (1) Fuel is discharged from the main port 14 in the partial operation and the high-speed operation. (2) No fuel is discharged from the main port 14 in an idle operation. The conditions (1) and (2) are the same as those of the conventional carburetor.

As for the dividing wall 12*a* of the intake member 12, a step portion 12*b* is formed at an upstream end portion of the dividing wall 12*a*. When the throttle valve 6 is seated in the step portion 12*b*, the throttle valve 6 comes into a fully-open state.

As a modification of the dividing wall 12*a*, the dividing wall 12*a* without the step portion 12*b* may extend to an upstream end of the intake member 12 as shown in FIGS. 6 and 7.

Figure 8:
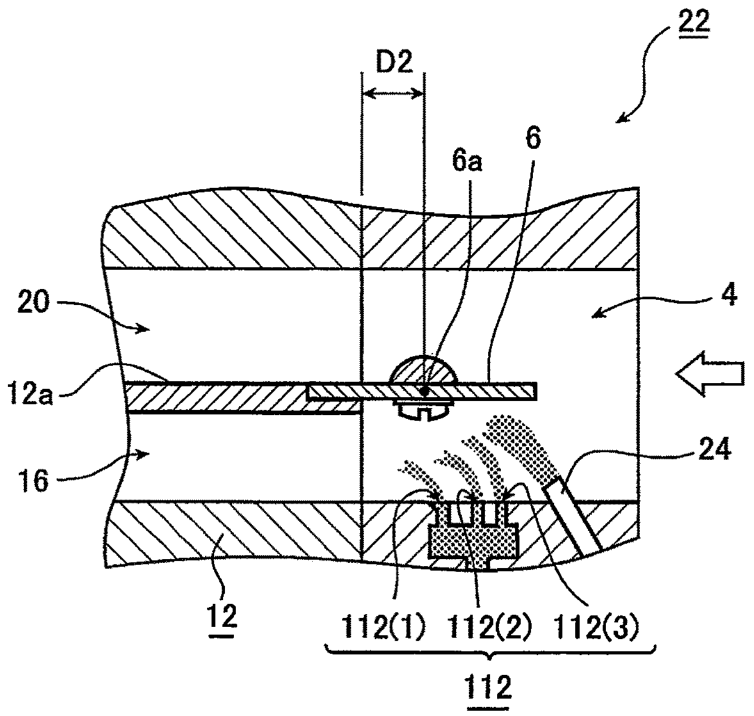
FIG. 8 shows a diagram for explaining the principle of the present invention by employing a carburetor including a main nozzle as an example, in which a throttle valve is in a fully-open state.
Figure 9:
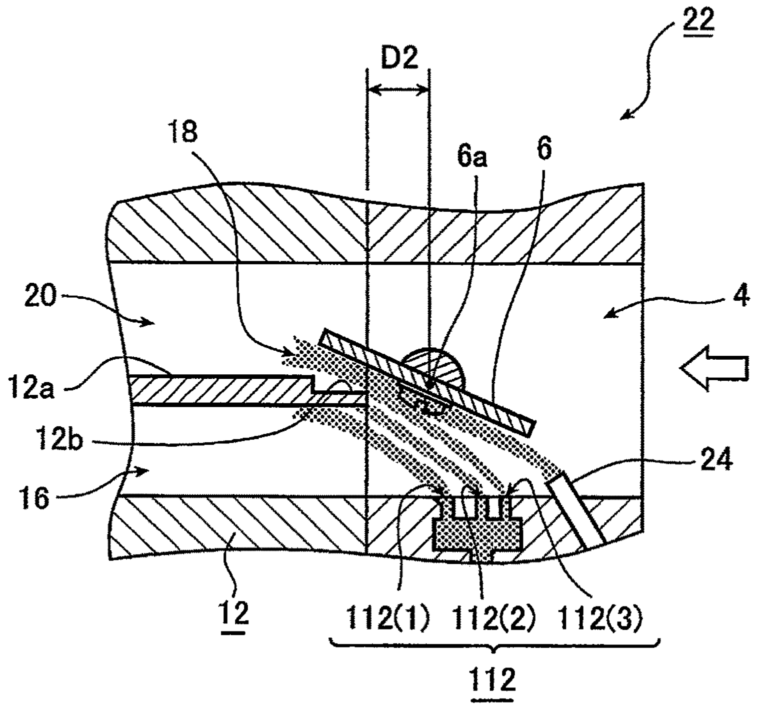
FIG. 9 shows a diagram for explaining the principle of the present invention by employing the carburetor including the main nozzle as an example, in which the throttle valve is in a partially-open state.

FIGS. 8 and 9 show diagrams for explaining one specific example of the carburetor according to the present invention. A carburetor 22 shown in FIGS. 8 and 9 basically corresponds to the above carburetor 2 shown in FIGS. 4 and 5. In a description of the carburetor 22 shown in FIGS. 8 and 9, the same elements as those described with reference to FIGS. 4 and 5 are assigned the same reference numerals, and a description thereof is omitted.

Figure 10:
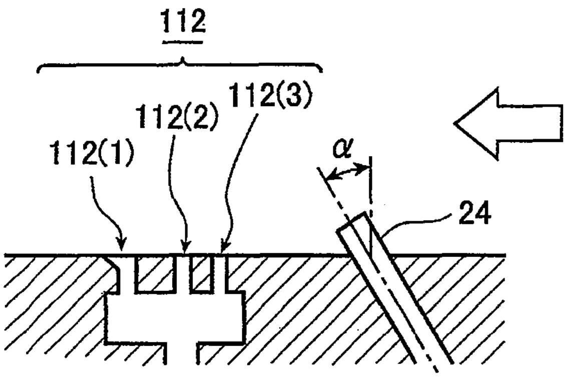
FIG. 10 shows a diagram for explaining inclination of the main nozzle in the carburetor including the main nozzle that is arranged so as to be inclined.

While the carburetor 2 shown in FIGS. 4 and 5 includes the main port 14 that opens in the wall surface defining the intake air passage 4, the carburetor 22 shown in FIGS. 8 and 9 includes a main nozzle 24 that is located projecting from the wall surface of the intake air passage 4 instead of the main port 14. The main nozzle 24 is preferably positioned in a state in which the main nozzle 24 is inclined toward the downstream side of the flow direction of the intake air. An angle of the inclination is indicated by "$\alpha$" in FIG. 10.

A length and the inclination angle of the main nozzle 24 are set based on a condition that the main nozzle 24 does not interfere with the swinging throttle valve 6. In consideration of an angle at which a work of press-fitting the main nozzle 24 into a hole in the wall surface defining the intake air passage 4 can be performed with no difficulty when the carburetor 22 is produced, the inclination angle $\alpha$ of the main nozzle 24 is set to an angle smaller than the angle at which the main nozzle 24 can be press-fitted, and an angle at which the fuel is stably discharged from the main nozzle 24. The inclination angle $\alpha$ is specifically 0° to 50°, preferably 10° to 40°, and most preferably 10° to 35°.

In the above carburetor disclosed in U.S. Pat. No. 7,201,120 B2, the inclination angle α of the main nozzle is larger than 30°.

FIG. 8 shows a state of the carburetor 22 in the high-speed operation. FIG. 9 shows a state of the carburetor 22 in the partial operation. Since an action of the carburetor 22 shown in FIGS. 8 and 9 is substantially the same as that of the carburetor 2 described with reference to FIGS. 4 and 5, a description thereof is omitted.

Figure 11:
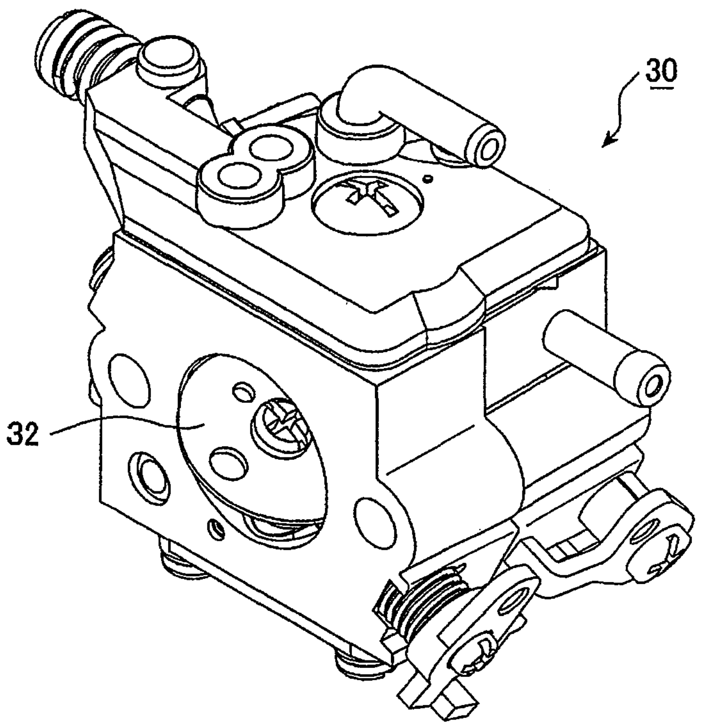
FIG. 11 shows a perspective diagram of a carburetor with no venturi portion of an embodiment.

FIG. 11 and the drawings after of show a throttle valve-type carburetor 30 of the embodiment. The carburetor 30 of the embodiment is applied to the stratified scavenging two-stroke internal combustion engine. The two-stroke engine has a single cylinder, and its displacement is 20 cc to 120 cc. In a description of the carburetor 30 of the embodiment, the same elements as those described with reference to FIG. 4 or the like are assigned the same reference numerals, and a description thereof is omitted. Specific examples of a portable working machine equipped with the engine of the embodiment include a chain saw, a trimmer, a power blower, an engine-type pump, a small generator, and an agricultural chemical sprayer.

Figure 12:
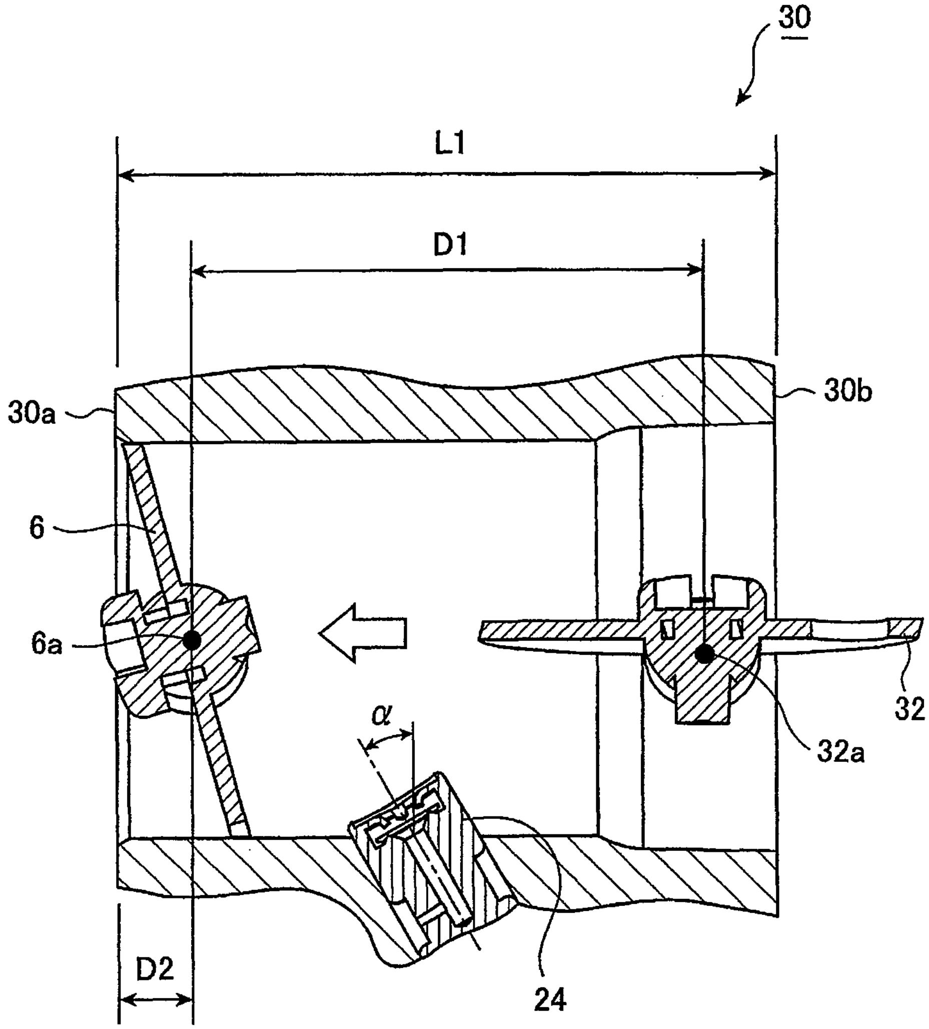
FIG. 12 shows a sectional diagram for explaining an internal structure of the embodiment.

From FIG. 11 (a perspective diagram of the carburetor 30), a person skilled in the art would immediately understand that the carburetor 30 is compact. FIG. 12 shows a sectional diagram of the carburetor 30. Referring to FIG. 12, the carburetor 30 includes a choke valve 32 in addition to the throttle valve 6. As is immediately understood in comparison with the conventional example in FIG. 18 or the like that has been previously referred to, the carburetor 30 of the embodiment does not include a venturi portion (reference numeral 104 in FIG. 18) in the intake air passage 4.

An arrow in FIG. 12 indicates the flow direction of the intake air. The throttle valve 6 and the choke valve 32 are arranged adjacent to each other. A center distance D1 (FIG. 12) between the throttle valve shaft 6*a* and a choke valve shaft 32*a* is substantially equal to a value obtained by adding a radius of the throttle valve 6 and a radius of the choke valve 32. When both the throttle valve 6 and the choke valve 32 are in a fully-open state, the throttle valve 6 and the choke valve 32 form substantially continuous surfaces flush with each other.

The main nozzle 24 is positioned immediately upstream of the throttle valve 6. The main nozzle 24 is arranged between the throttle valve 6 and the choke valve 32 arranged adjacent to each other.

The main nozzle 24 located immediately upstream of the throttle valve 6 is positioned so as to be inclined. In the embodiment, the inclination angle α of the main nozzle 24 is 25°. The main nozzle 24 is inclined in a direction in which a distal end thereof separates from a plate surface of the choke valve 32 in a fully-open state, and is directed toward a plate surface of the throttle valve 6 in a fully-open state. Because of the configuration, a dividing wall between the throttle valve 6 and the choke valve 32 becomes unnecessary. That is, it is possible to prevent the fuel discharged from the main nozzle 24 from entering the fresh air passage from the upstream side of the throttle valve 6 even when the dividing wall is not provided upstream of the throttle valve 6.

A downstream-side end surface 30*a* of the carburetor 30 is located adjacent to the shaft 6*a* of the throttle valve 6. Similarly, an upstream-side end surface 30*b* of the carburetor 30 is located adjacent to the shaft 32*a* of the choke valve 32.

Figure 18:
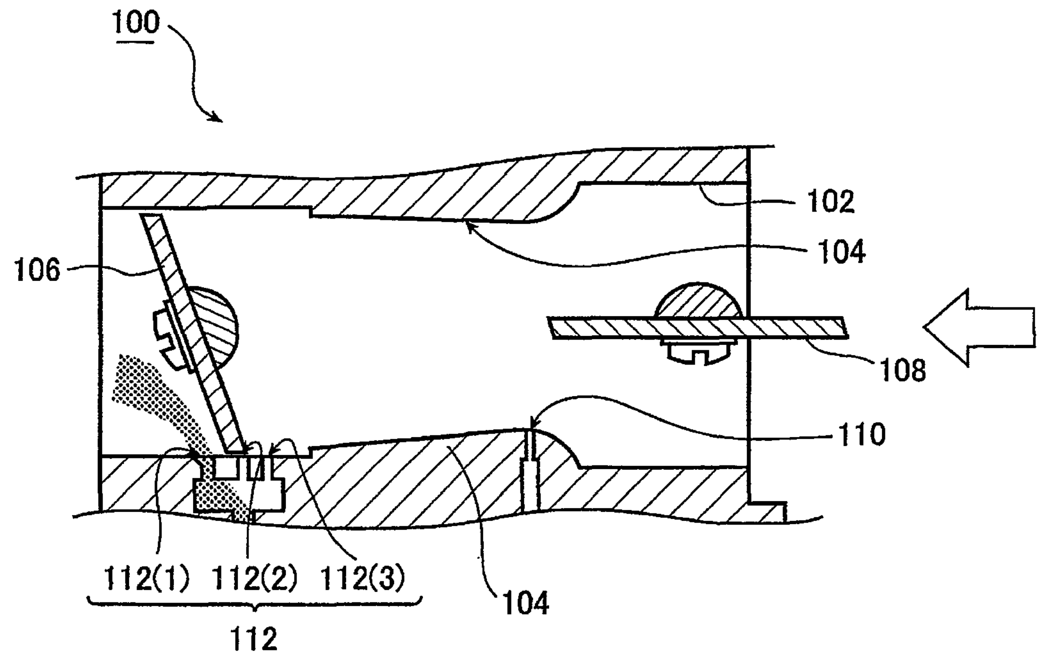
FIG. 18 shows a sectional diagram of a conventional and typical carburetor, and shows the carburetor in an idle operation state.
Figure 19:
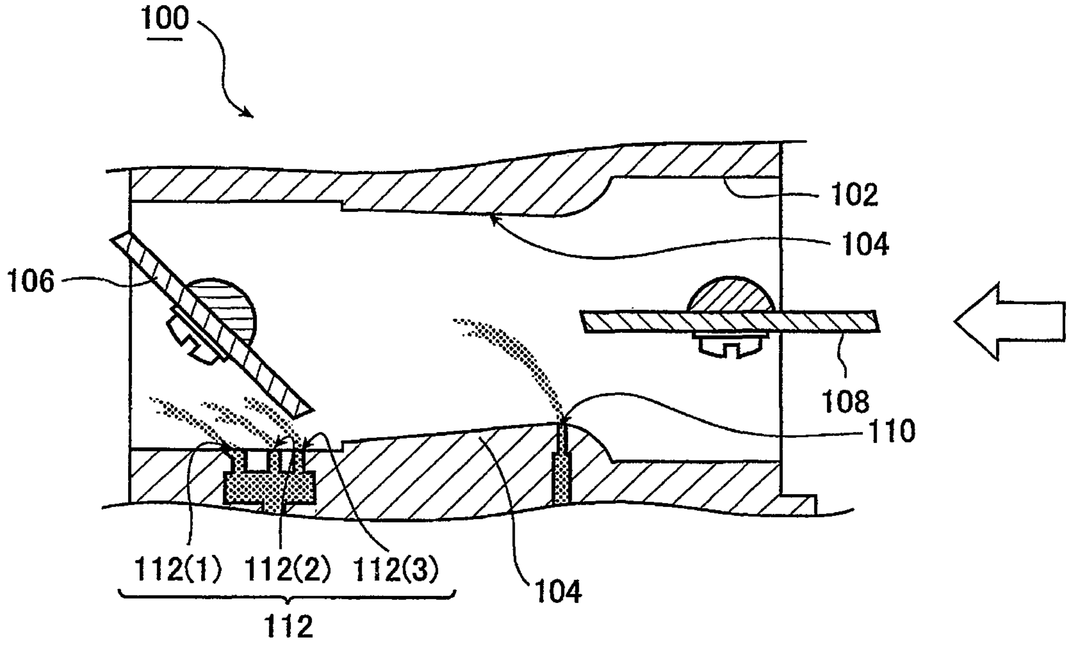
FIG. 19 shows a sectional diagram of the conventional and typical carburetor, and shows the carburetor in a partial operation state.
Figure 20:
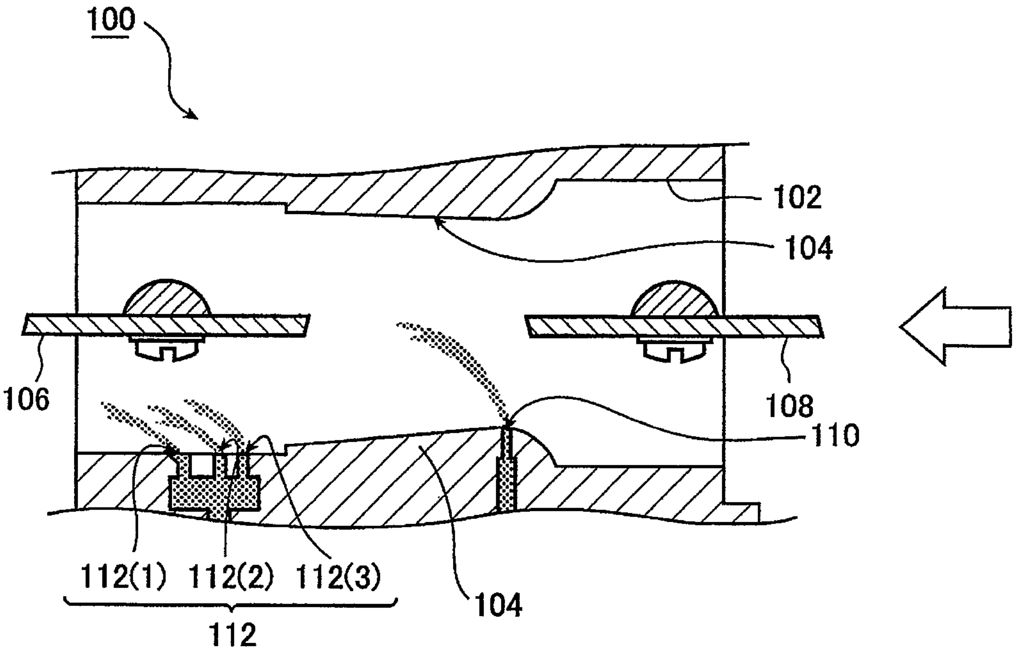
FIG. 20 shows a sectional diagram of the conventional and typical carburetor, and shows the carburetor in a high-speed operation state.
Figure 21:
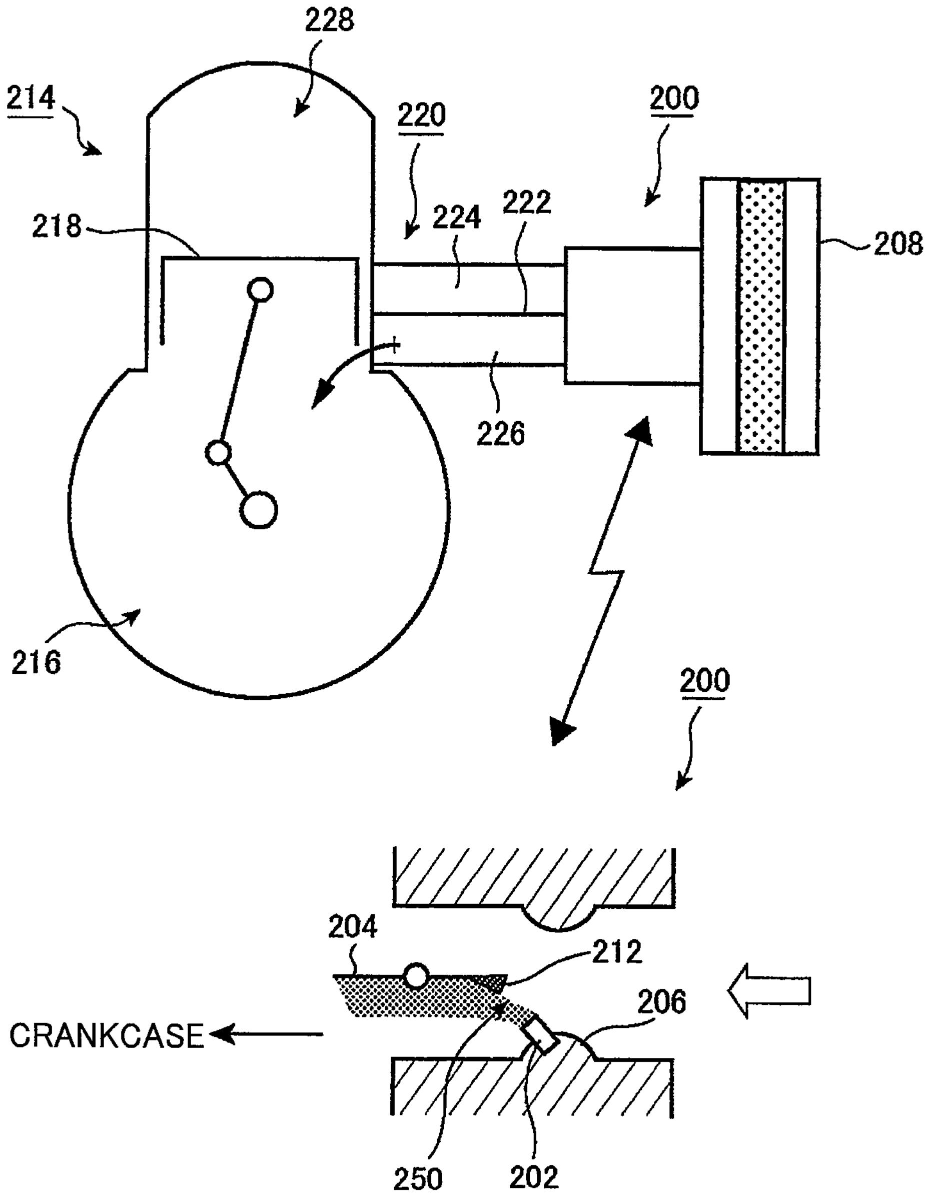
FIG. 21 shows a schematic diagram of a carburetor disclosed in U.S. Pat. No. 7,201,120 B2.

The carburetor 30 of the embodiment of the above configuration has a smaller length dimension L1 in the flow direction of the intake air than that in the conventional carburetor 100 (FIG. 18).

Reasons why the dimension L1 can be made smaller are as follows.

(1) The venturi portion 104 (FIG. 18) described in the conventional carburetor does not exist.

(2) The distance D1 between the throttle valve shaft 6*a* and the choke valve shaft 32*a* is small.

(3) The throttle valve shaft 6*a* is located adjacent to the downstream-side end surface 30*a* of the carburetor 30. That is, the distance D2 described in FIG. 6 and so on is small. To be more specific, the distance D2 is 3.2 mm. A bore size of the carburetor 30 is 17.5 mm.

(4) The choke valve shaft 32*a* is located adjacent to the upstream-side end surface 30*b* of the carburetor 30.

In the carburetor 30 of the embodiment, the venturi portion 104 (FIG. 18) does not exist as described above. Accordingly, the throttle valve 6 and the choke valve 32 can be arranged close to each other up to a position where the throttle valve 6 and the choke valve 32 do not interfere with each other.

Figure 13I:
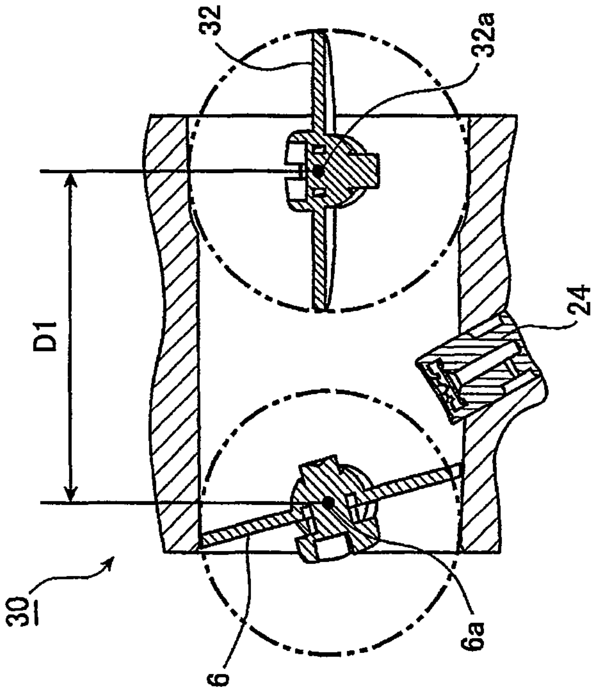
FIG. 13(I) shows a diagram for explaining that a throttle valve and a choke valve can be arranged close to each other up to a position where the throttle valve and the choke valve do not interfere with each other.
Figure 13:
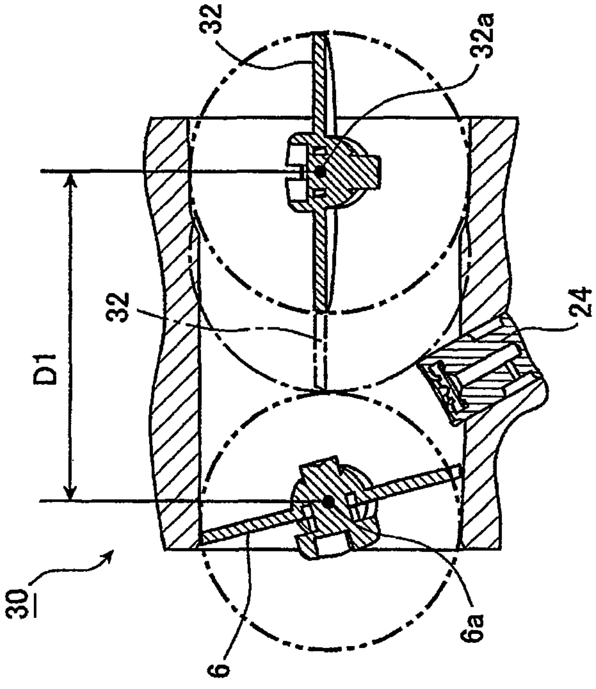
FIG. 13(II) shows an example in which the throttle valve and the choke valve are arranged slightly apart from each other.

FIG. 13 show diagrams for explaining the arrangement of the throttle valve 6 and the choke valve 32. FIG. 13(I) shows an example in which the throttle valve 6 and the choke valve 32 are arranged slightly apart from each other.

FIG. 13(II) shows a diagram for explaining that the throttle valve 6 and the choke valve 32 can be arranged close to each other up to a position where the throttle valve 6 and the choke valve 32 do not interfere with each other. It goes without saying that the main nozzle 24 arranged between the throttle valve 6 and the choke valve 32 is set to a position and a projecting amount where the main nozzle 24 does not interfere with the throttle valve 6 and the choke valve 32.

As described above, the venturi portion 104 is an essential element in the conventional carburetor 100 (FIG. 18). In the conventional carburetor 100, a configuration in which the main port 110 or the main nozzle is arranged at the top portion of the venturi portion 104 is employed, and the configuration has been considered as essential.

The inventors of the this application have verified that the venturi portion that has been conventionally considered as essential is not essential in the carburetor applied to the stratified scavenging engine. Based on the verification result, the carburetor 30 of the embodiment does not include the venturi portion. Accordingly, a degree of freedom regarding the arrangement position of the main port 14 or the main nozzle 24 is higher than that of the prior art. In other words, a distance between the throttle valve 6 and the main port 14 or the main nozzle 24 can be set to be small.

Also, since the main nozzle 24 can be positioned immediately upstream of the throttle valve 6, it is not necessary to set the inclination angle α of the main nozzle 24 to be large in order to direct the fuel discharged from the main nozzle 24 toward the plate surface of the fully-open throttle valve 6. The inclination angle α of the main nozzle 24 can be set to an angle that has already been actually produced. In the embodiment, the inclination angle α is 25°.

Figure 14:
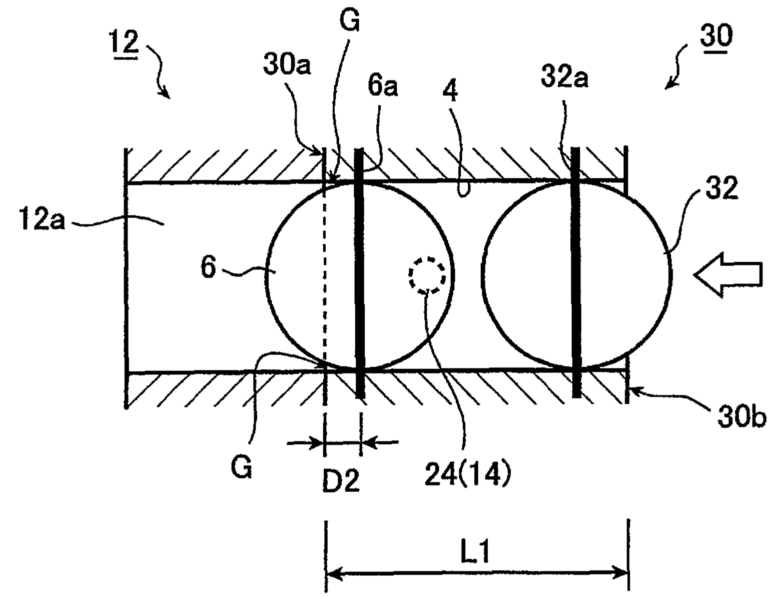
FIG. 14 shows a diagram for explaining an advantage obtained when a throttle valve shaft and a downstream-side end surface of the carburetor are located adjacent to each other when the carburetor of the embodiment is viewed in plan view.
Figure 15:
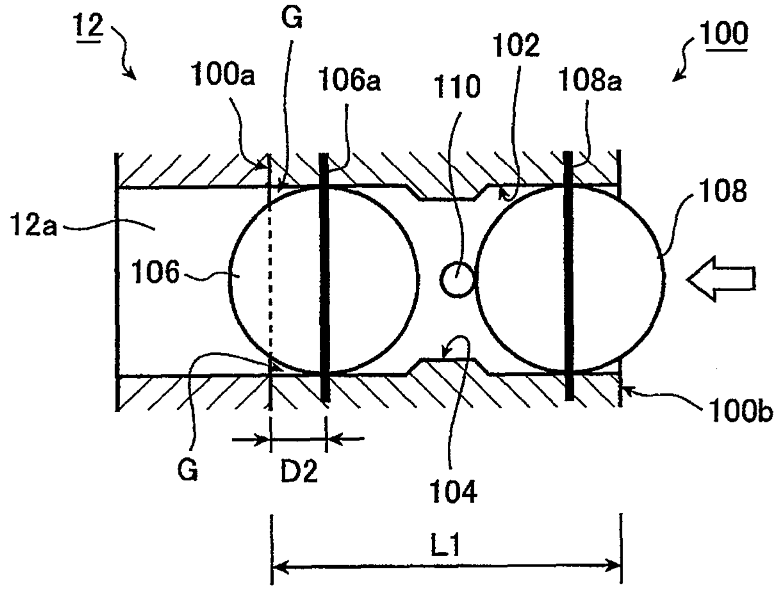
FIG. 15 shows a diagram for explaining that a throttle valve shaft and a downstream-side end surface of a conventional carburetor are apart from each other when the conventional carburetor is viewed in plan view, and a gap is thereby generated downstream of a throttle valve in a fully-open state.

Referring to FIG. 14, the distance D2 between the downstream-side end surface 30*a* of the carburetor 30 and the throttle valve shaft 6*a* is smaller than that of the conventional carburetor. Accordingly, the length dimension L1 of the carburetor 30 can be made smaller. That is, the carburetor 30 can be made more compact than that of the conventional carburetor. FIG. 15 shows the conventional example.

As is well understood from FIG. 15 (the conventional example), since a downstream-side end surface 100*a* of the carburetor 100 is spaced from a throttle valve shaft 106*a*, a gap G is formed downstream of the throttle valve 106 in a fully-open state. Reference numeral 12 in FIG. 15 denotes the intake member described above. The intake member 12 is arranged between the carburetor 100 and the engine body. Reference numeral 12*a* denotes the dividing wall. The air-fuel mixture passage 16 and the fresh air passage 20 are divided by the dividing wall 12*a* (FIG. 4).

Referring to FIG. 15 (the prior art), when the fully-open throttle valve 106 is viewed in plan view, the gaps G on both sides of the throttle valve 106 are one of causes for decreasing the degree of separation between the air-fuel mixture and the fresh air in the high-speed operation.

Referring to FIG. 14, the distance D2 between the downstream-side end surface 30*a* of the carburetor 30 of the embodiment and the throttle valve shaft 6*a* is small. Accordingly, the gaps G on both sides of the throttle valve 6 can be made as small as possible. It goes without saying that the gap G becomes smaller as the distance D2 is decreased. An area of the gap G is also reduced in a quadratic curve as the distance D2 is reduced.

When the distance D2 between the throttle valve shaft 6*a* and the downstream-side end surface 30*a* adjacent thereto is ½ or less of the radius of the throttle valve 6, a gas flow passing through the gap G can be considered as almost zero. In the embodiment, the throttle valve shaft 6*a* is arranged at a position of 3.2 mm from the downstream-side end surface 30*a*. The numeric value of 3.2 mm is smaller than ½ of the radius of the throttle valve 6. Accordingly, the gas flow through the gap G can be ignored in the high-speed operation, that is, when the throttle valve 6 is in a fully-open state. The degree of separation between the air-fuel mixture and the fresh air can be thereby increased.

That is, in accordance with the carburetor 30 of the embodiment, by decreasing the distance D2 between the downstream-side end surface 30*a* and the throttle valve shaft 6*a*, it is possible to eliminate the necessity for extending the dividing wall 12*a* of the intake member 12 in order to fill the gaps G, and it is thereby possible to provide the simple and compact carburetor for the stratified scavenging engine.

Figure 16:
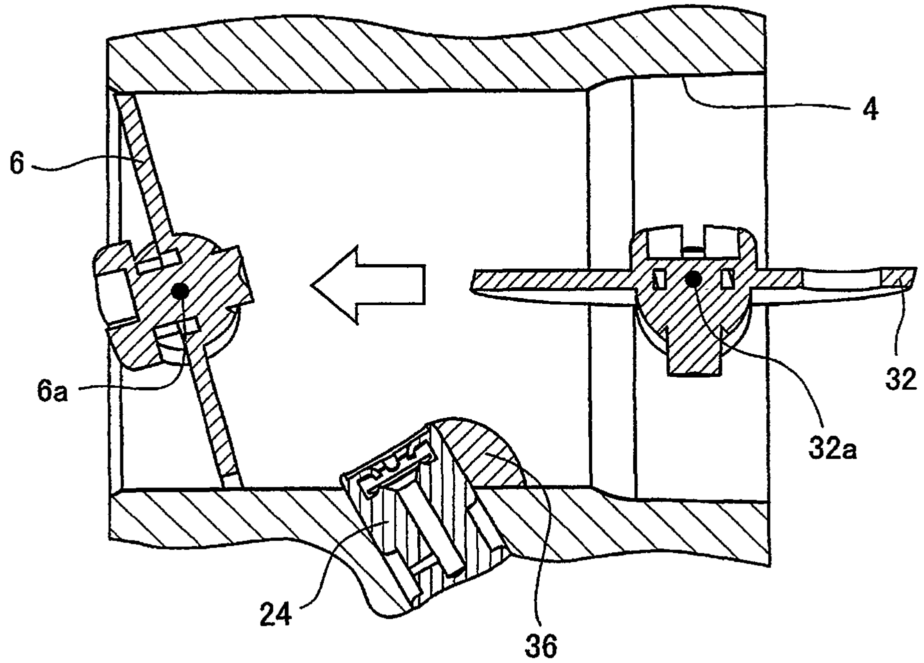
FIG. 16 shows a diagram for explaining an example in which a flow rectifying element is arranged immediately upstream of a main nozzle included in the carburetor of the embodiment.

The present invention has been specifically described above. The present invention includes various specific aspects and modifications included in the invention defined by the claims. FIG. 16 shows a diagram for explaining an example in which an element 36 that rectifies the air flow is arranged immediately upstream of the main nozzle 24. The air flowing through the intake air passage 4 passes through the main nozzle 24 in a state in which the flow is partially rectified by the flow rectifying element 36. Accordingly, a discharge amount of the fuel discharged from the main nozzle 24 can be made stable.

The flow rectifying element 36 may be formed by raising a portion of the wall surface defining the intake air passage 4. The flow rectifying element 36 may be formed by building up a portion of the wall surface defining the intake air passage 4. The flow rectifying element 36 may be formed by a member integrated with the main nozzle 24.

Of course, the flow rectifying element 36 may be also provided immediately upstream of the main port 14 described with reference to FIGS. 4 and 5. To be more specific with respect to the example in FIGS. 4 and 5, a portion of the local small bulge 15 where the main port 14 opens may be formed in a shape exerting a flow rectifying effect.

Figure 1:
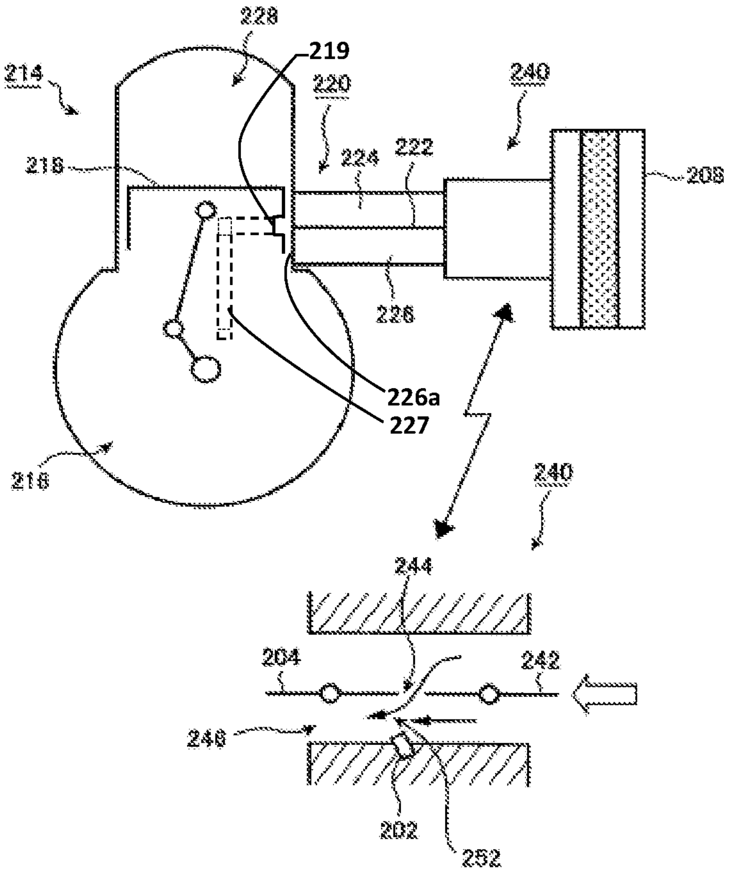
FIG. 1 shows a diagram for explaining a principle of a carburetor of the present invention.
Figure 2:
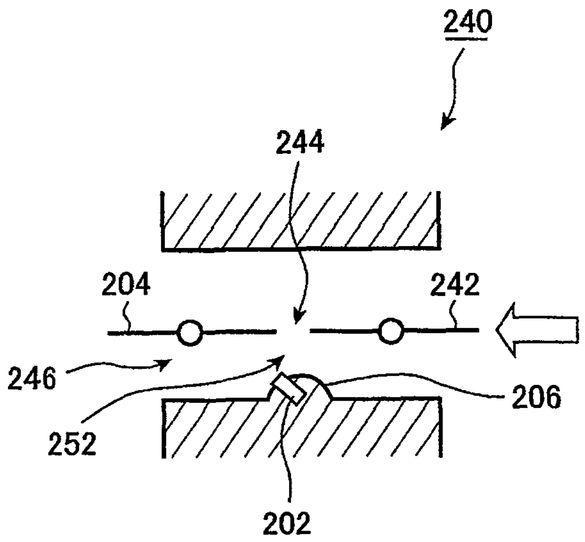
FIG. 2 shows a diagram for explaining a modification included in the carburetor of the present invention.
Figure 3:
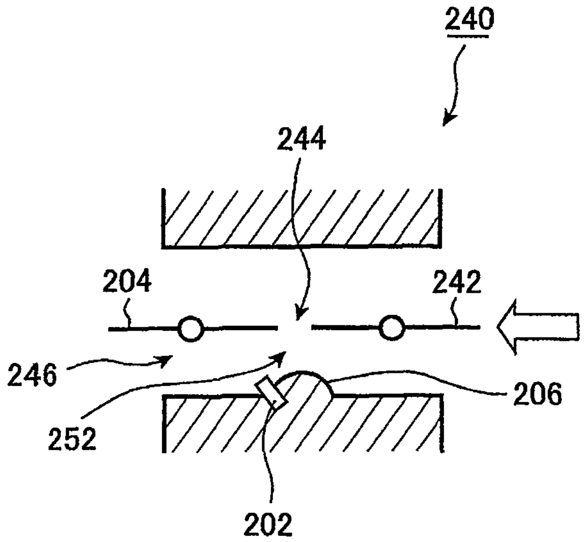
FIG. 3 shows a diagram for explaining another modification included in the carburetor of the present invention.
Figure 17:
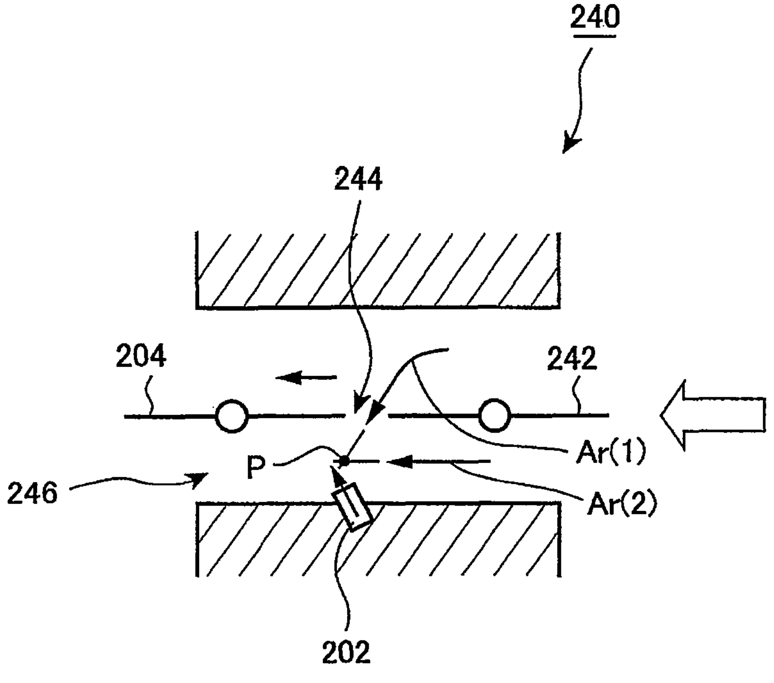
FIG. 17 shows a diagram for explaining a preferred position toward which fuel discharged from the main nozzle or the main port is directed in the carburetor including the throttle valve and the choke valve.

Preferred arrangement of the main nozzle 202 is described by using the carburetor 240 including the throttle valve 204 and the choke valve 242 as an example with reference to FIGS. 1 to 3. FIG. 17 shows the same carburetor 240 as that shown in FIG. 1.

Referring to FIG. 17, fresh air Ar(1) entering the air-fuel mixture passage 246 through the gap 244 between the throttle valve 204 and the choke valve 242, and drawn air Ar(2) entering the air-fuel mixture passage 246 join each other at a point P of the air-fuel mixture passage 246. The fuel discharged from the main nozzle 202 is preferably directed toward the joining point P or the downstream side thereof. To be more specific, the joining point P is located ahead (the downstream side) of a longitudinal intermediate position of the gap 244 formed between the throttle valve 204 and the choke valve 242. That is, the discharge port of the main nozzle 202 is directed toward the downstream side of the longitudinal intermediate position of the gap 244. Of course, the arrangement position and the inclination angle of the main nozzle 202 are preferably set such that the air-fuel mixture passage 246 defined by the lower surface of the throttle valve 204 can receive the whole fuel discharged from the main nozzle 202.

The same applies to the carburetor that employs the main port instead of the main nozzle 202.

REFERENCE SIGNS LIST

- 2 One specific example of a carburetor according to the present invention
- 4 Intake air passage
- 6 Throttle valve
- 6*a* Throttle valve shaft
- 12 Intake member
- 12*a* Dividing wall of the intake member
- 14 Main port
- 16 Air-fuel mixture passage
- 18 Gap between the throttle valve in a partially-open state and the dividing wall
- 20 Fresh air passage
- 22 Another specific example of the carburetor according to the present invention
- 24 Main nozzle
- α Inclination angle of the main nozzle
- 30 Carburetor of Embodiment
- 32 Choke valve
- 32*a* Choke valve shaft
- L1 Length dimension from an upstream end to a downstream end of the carburetor
- D1 Center distance between the throttle valve shaft and the choke valve shaft
- 36 Flow rectifying element

What is claimed is:

1. A stratified scavenging two-stroke internal combustion engine comprising:

- a piston valve-type engine body;
- a carburetor being interposed between the engine body and an air cleaner;
- an intake member connecting the carburetor and the engine body, the intake member including a fresh air passage and an air-fuel mixture passage, and the air-fuel mixture passage is capable of communicating with a crankcase of the engine body;
- wherein the carburetor includes an intake air passage receiving air filtered by the air cleaner, a throttle valve that is arranged in the carburetor and is composed of a plate butterfly valve, and a main nozzle or a main port discharging fuel toward a plate surface of the throttle valve in a fully-open state, wherein the engine body includes a scavenging passage that feeds an air-fuel mixture in the crankcase to a combustion chamber to perform scavenging, an air port that receives fresh air from the fresh air passage, a piston groove that is provided in a peripheral surface of a piston so as to fill an upper portion of the scavenging passage with the fresh air from the air port, and an air-mixture port that communicates the air-fuel mixture passage with the crankcase characterized in that an upstream side of the throttle valve is composed of an open space with no dividing wall, in the carburetor, an opening timing of the air-fuel mixture port is set to be earlier than a timing at which the air port and the scavenging passage communicate with each other via the piston groove, wherein the crankcase starts to be charged with the air-fuel mixture from the air-fuel mixture passage before the timing at which the upper portion of the scavenging passage starts to be charged with the fresh air through the piston groove and the scavenging passage communicating with each other during an upstroke of the piston, whereby a whole amount of the fuel discharged from the main nozzle or the main port flows into the air-fuel mixture passage in the fully-open state of the throttle valve and that, once released into the air-fuel mixture passage, the whole amount of the fuel discharged from the main nozzle or the main port stays in the air-fuel mixture passage until introduced into the crankcase during the upstroke of the piston, wherein the carburetor includes no venturi portion on an upstream side of the throttle valve, and no air valve on an upstream side of the throttle valve for adjusting a quantity of the fuel to the intake air passage through the main nozzle or the main port, wherein the fuel is discharged obliquely and toward a downstream side of the carburetor from the main nozzle or the main port.

2. The stratified scavenging two-stroke internal combustion engine of claim 1, wherein the main nozzle is arranged so as to be inclined toward a downstream side of the carburetor.

3. The stratified scavenging two-stroke internal combustion engine of claim 1, wherein a discharge port of the main nozzle is located at a position not interfering with a rotation locus of an outer end edge of the throttle valve, and adjacent to the rotation locus.

4. The stratified scavenging two-stroke internal combustion engine of claim 1, a distance between a shaft of the throttle valve and a downstream-side end surface of the carburetor is ½ or less of a radius of the throttle valve in plan view.

5. The stratified scavenging two-stroke internal combustion engine of claim 1, wherein the main port opens in a top portion of a local bulge that projects from a wall surface defining the intake air passage.

6. The stratified scavenging two-stroke internal combustion engine of claim 1, further comprising a flow rectifying element arranged adjacent to and immediately upstream of the main nozzle or the main port for rectifying a flow of intake air passing through the main nozzle or the main port.

7. The stratified scavenging two-stroke internal combustion engine of claim 1, further comprising a choke valve that is arranged upstream of the throttle valve and is composed of a butterfly valve, wherein an interval between the choke valve and the throttle valve is an open space with no dividing wall.

8. The stratified scavenging two-stroke internal combustion engine of claim 7, wherein intake air flowing through an upper region of the choke valve flows into a lower region of the throttle valve through the open space between the choke valve and the throttle valve, and the fuel discharged from the main nozzle or the main port is directed toward a position P where first intake air flowing into the lower region of the throttle valve through the open space joins second intake air flowing through a lower region of the choke valve, or a downstream side of the position.

9. The stratified scavenging two-stroke internal combustion engine of claim 7, wherein the choke valve and the throttle valve are arranged close to each other up to a position where the choke valve and the throttle valve do not interfere with each other, and a distance between a shaft of the choke valve and a shaft of the throttle valve is equal to a value obtained by adding a radius of the choke valve and a radius of the throttle valve.

* * * * *